Oct. 4, 1949.  G. G. RAYMOND  2,484,001
MOTOR FIELD FRAME AND METHOD OF FABRICATION
Filed Nov. 20, 1945  2 Sheets-Sheet 1

INVENTOR
GEORGE G. RAYMOND
BY
ATTORNEYS

Oct. 4, 1949.　　　　G. G. RAYMOND　　　　2,484,001
MOTOR FIELD FRAME AND METHOD OF FABRICATION
Filed Nov. 20, 1945　　　　2 Sheets-Sheet 2
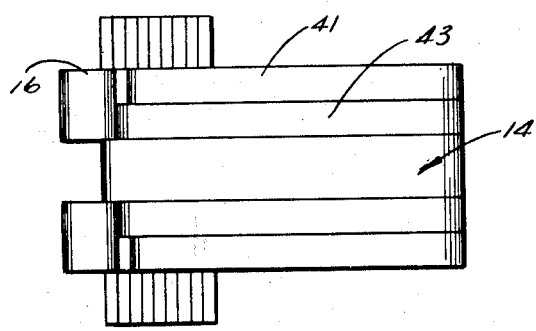
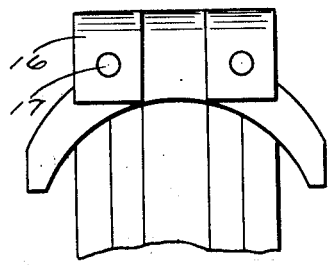
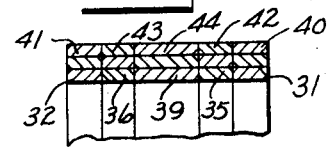
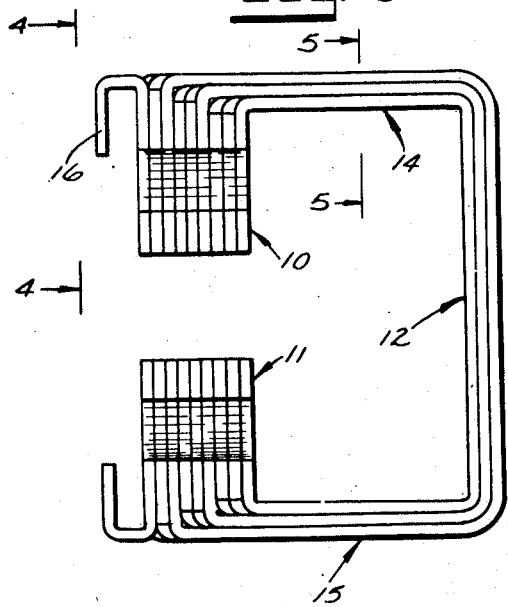
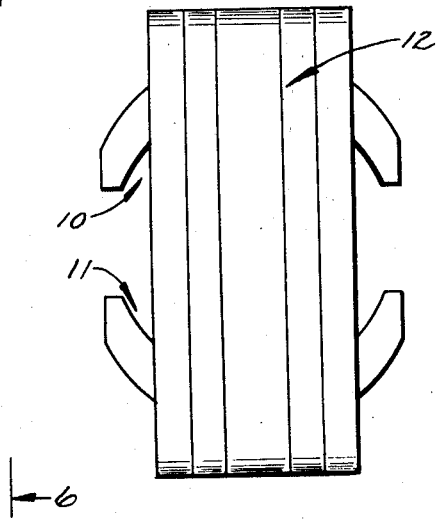
INVENTOR.
GEORGE G. RAYMOND
BY
ATTORNEYS Patented Oct. 4, 1949

2,484,001

UNITED STATES PATENT OFFICE 2,484,001

MOTOR FIELD FRAME AND METHOD OF FABRICATION

George G. Raymond, Binghamton, N. Y., assignor to General Aniline & Film Corporation, New York, N. Y., a corporation of Delaware Application November 20, 1945, Serial No. 629,896

6 Claims. (Cl. 172—36)

This case pertains to an invention in field frames for electric motors, either of direct current or alternating current type, and more especially to field frames for smaller units in which lightweight, compactness, and maximum efficiency are desired.

Among the objects of the invention is the construction of a field frame which shall be of laminated type and which shall be formed from metals most desirable for their electrical characteristics.

Another object of the invention is that of constructing a field frame of lightweight for the size and power of the unit, and one which shall be rugged and easily formed from relatively thin sheet material.

Another object of the invention is that of constructing a field frame in which the pole pieces, back strap, and those parts connecting the pole pieces and back strap shall be entirely of laminated construction and in which the said laminations are blanked from sheet material and later formed by simple bending operations into a complete, interlocking, nested assembly.

Other objects of the invention include the cutting down of eddy currents and/or hysteresis losses and minimizing electrical or magnetic losses thereby to obtain a complete electric motor which shall be of lightweight for power developed and which shall function on a minimum of current for that power, thereby to make possible lightweight devices in which said motor functions to operate other mechanism.

It is also a purpose of the invention to increase the efficiency of D. C. motors thereby to make it possible to operate them on batteries of smaller size and weight, or to operate them for a longer period of time to produce maximum intended power on current from a battery of any particular size and weight.

Another object of the invention is that of constructing a field frame in which the lines of magnetic flux are so disposed and so distributed that maximum efficiency and distribution of the flux is carried through to the pole pieces. In other words, the construction hereinafter to be described in detail makes possible distribution of flux over the total pole area in a substantially uniform manner or with substantially uniform density per unit of area.

Another object of the invention is that of devising a method for fabricating a field frame of the type herein described.

Other objects will be apparent from the following description.

While the invention is by no means to be limited to use in any particular field, small motors used in photographic cameras, such as the personal type movie cameras, may advantageously employ the invention. In such cameras, it is desirable to keep weight and size at a minimum. To that end the electrical power unit should be as efficient as possible since batteries on which they function are naturally fairly heavy and if they contribute too much toward the total weight, then such sources of motive power are not desirable. For that reason, electrically operated cameras have not become popular even though those powered by spring type motors have obvious disadvantages since they have to be rewound frequently and since when they have run down to a certain extent and if not rewound, operate too slowly for effective moving picture exposure.

Accordingly, since the efficiency of an electric motor is to a great extent governed by the magnetic efficiency of the field frame itself, the present invention offers decided advantages. Losses due to eddy currents and other phenomena are especially undesirable in the smaller units and thus any appreciable decrease of these losses is to be desired not only for motors functioning for the particular purpose above mentioned, but for electrical equipment wherever the principles of the invention may be applied.

As will be described in detail by reference to one specific embodiment which the invention may take, the motor field frame, subject matter of this case, is fabricated from metals which are selected for their magnetic characteristics, that is, the metals employed are those offering the greatest magnetic permeability and which are, therefore, more efficient. The material employed is either of sheet or strip stock which is easily obtained and from which the individual laminations are easily cut or blanked. The complete frame is made up from several assemblies, each of which is comprised of a number of blanked pieces bent to form the same number of laminations at the pole pieces, but a single thickness of material at the back strap and portions connecting said back strap to the pole pieces. Of course, the field windings may be located at the said connecting portions.

Any desired number of the said assemblies having a similar number of laminations and back strap and connecting parts of single thickness may then be united, each successive sub-assembly having its back strap and connecting part progressively shorter so that they nest in that preceding sub-assembly. Assembly is effected by sliding them in from either side. When once assembled and wound, the entire unit becomes functionally integral.

One specific embodiment of the invention will be described by reference to the accompanying figures of drawing, in which:

Fig. 2 is a top view of the frame.

Fig. 3 is a side elevation of the field frame.

Fig. 4 is a detail view taken at the front of the frame and showing the upper portion thereof, the lower part being similar except oppositely directed.

Fig. 5 is a section taken at line 5—5, Fig. 3.

Fig. 6 is a view taken looking in the direction of line 6—6, Fig. 3.

Figure 1:
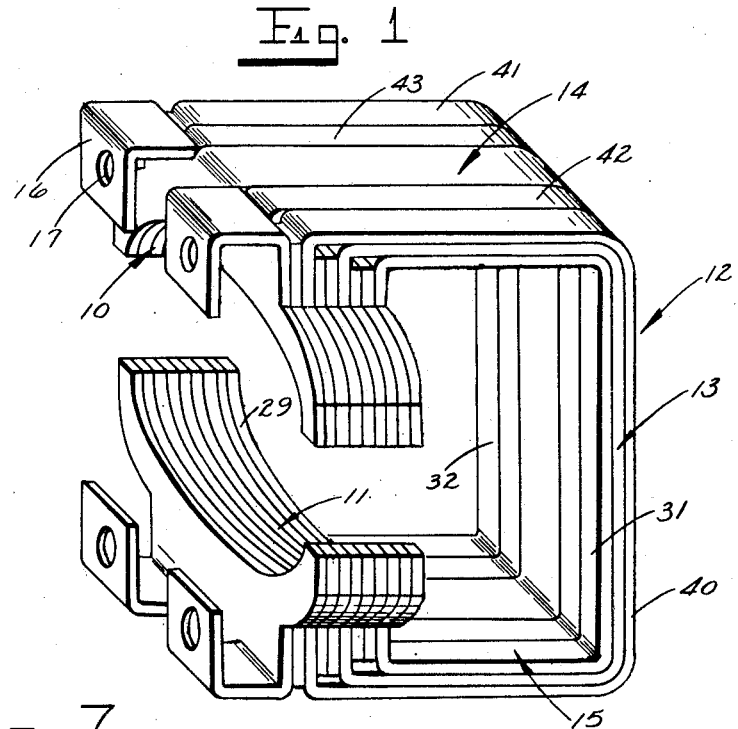
Fig. 1 is an isometric view of the assembled field frame.

Now referring to Fig. 1, the field frame includes the pole pieces 10 and 11 between which a cylindrical opening is provided for the reception of the rotating armature, that is, providing the armature is the rotating part of the device. Other parts of the frame include a connecting strap or yoke generally referred to by numeral 12, and herein comprising what will be termed a back strap 13 with top connecting portion 14 and the lower connecting portion 15. At the front of the frame there are projections, one of which is designated by numeral 16, these being for the purpose of connecting a plate at the center of which is provided a bearing for the armature shaft. These projections have holes 17 for reception of some connecting means.

Figure 8:
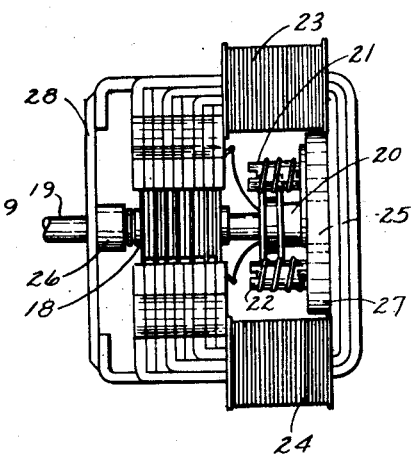
Fig. 8 is a partial section taken through a motor constructed in accordance with the invention.

Now referring to Fig. 8, the conventional parts of a motor in which the frame of Fig. 1 may be employed include an armature 18, shaft or spindle 19, commutator 20, and brushes (not shown) but which are attached and operated upon the studs 21 and 22. Other parts include the field windings 23 and 24 which occupy the space between the back strap 13 and the pole pieces and which are wound about the connecting portions 14 and 15, respectively. No attempt is made to show all the wiring or other details, and it is to be understood that all conventional parts of the motor are to be found including bearings 25 and 26, the first of which bearings is centrally located in a plate 27 attached at the back strap and of non-magnetic material so that it has no effect on the magnetic field in the frame itself. Bearing 26 is located centrally of a suitable end plate 28 attached by any suitable connecting means to the projections 16 above mentioned. This plate is likewise non-magnetic.

In Fig. 8, a direct current type motor is illustrated, but it is to be understood that the invention applies as well to alternating current motors and in that event, the various parts just described would be of alternating rather than direct current type. It is immaterial whether the motor works in a horizontal position or vertically, and, depending upon the conditions of installation, some suitable means for attaching the motor is provided.

Figure 7:
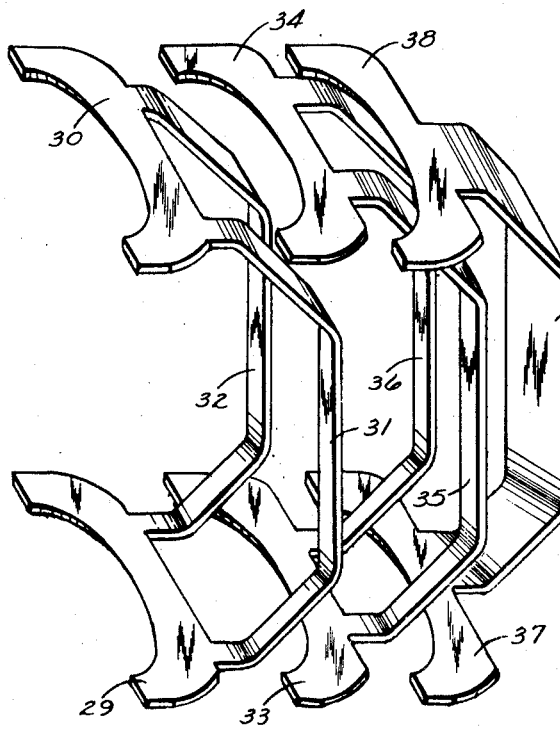
Fig. 7 is a view showing one sub-assembly during the process of being bent to a finally assembled and interlocking relationship.

Now referring to Figs. 1–7, a description of the frame itself and method of fabricating it will be given. The particular embodiment herein described has sub-assemblies made up from three blanked parts as shown in Fig. 7. At the pole pieces 8, laminations result from the peculiar method of fabrication and construction despite the fact that at the yoke or connecting portion, there is only a single thickness of material. Taking these blanked parts one at a time, the innermost pole pieces 29 and 30 are connected by long, integral strips 31 and 32, adjacent the outer ends of said pole pieces. The central pole pieces 33 and 34 are connected by similar strips 35 and 36, but which are located slightly closer to the center of the assembly than the strips 31 and 32. Finally the end pole pieces 37 and 38 are connected by a strip 39 centrally located between the ends of the pole pieces, but which is of a width substantially equal to the combined width of the pieces 31 and 32 or 35 and 36. These pieces 31, 35, etc. abut against each other and when the parts have been bent so that the upper pole pieces 30, 34, and 38 are brought into alignment, the five connecting pieces which go to make up the back strap and top and bottom connecting elements, will be of a single thickness, one-third that of the pole pieces, and will appear as a single connecting element or yoke, except for the dividing lines between separate strips. As can be seen from observation of the various figures, when a sub-assembly has been fabricated, the parts tend to lock themselves in position. For example, the three pieces which make up the assembly of Fig. 7 may not be disassembled except by bending the parts out of shape in a manner similar but reversely to that practiced when they were assembled.

In the particular example hereby given, each sub-assembly consists of three blanked parts. Of course, that may be varied and two or any reasonable number of parts may comprise a sub-assembly. In that event, the number of strips forming the yoke will naturally vary and the practical limit would be reached when, for a given size of frame, the strips forming the connecting yoke would become too small for practical purposes.

The complete frame of Figs. 1–6 is made up from three sub-assemblies, each of which is slightly larger if we are to consider that of Fig. 7 as the smallest or inside sub-assembly. Three such units combine to form a frame having nine laminations at the pole pieces and three laminations, each of which is five (four single plus one double) strips wide, at the back strap and top and bottom connecting parts. The outermost or largest blanked part is that which has the projections 16, that particular piece thus being slightly more complicated as to its form and also requiring separate operations to bend the projections to shape.

The efficiency of a field frame varies with many factors. The frame herein described may be blanked from such materials as silicon steel which has very good electrical properties for the purpose. Cold-rolled or cold-drawn steel may be employed and, in general, metals are selected which lend themselves to the process of fabrication, but which are also most permeable to the magnetic field set up.

In most small units of this type, losses due to eddy currents and to improper distribution of the magnetic flux at the pole pieces have rendered them inefficient and it is a characteristic of the frame herein described that such eddy currents, hysteresis and other losses are kept at a minimum while the flux density for the entire pole areas is maintained as uniform as practicable. To that end, the continuous and uninterrupted path through the back strap portions is unique in a motor field frame of laminated construction. It is a well-known fact that laminated pole pieces are most desirable. Furthermore, the distribution of the strips in the various sub-assemblies is such that as the greater density magnetic flux occurs at the outer edges of the cross-section of the connecting portion and at the corners thereof, that flux is evenly distributed to the various laminations at the pole pieces.

Referring to Fig. 1, the strips 31 and 32 are corner strips at the yoke or strap and are a part of the innermost laminations 29. The strips 35 and 36 provide an uninterrupted path at the inner surface of the back strap and connect to the next adjacent lamination at the pole pieces. Likewise, the central strip 39 is a part of the third pole piece 37.

Now, in the laminations at the center of the pole pieces, the end strips run to the fourth from the inside, while the central strips run to the fifth and sixth laminations counting from the inside toward the front.

At the outermost section, the end corner strips numbered 40 and 41 are unitary with the seventh lamination, and the inner strips 42 and 43 are a part of the eighth lamination, while the central strip 44, of double width, is the longest and connects to the ninth lamination at the front. It will be seen from an inspection of Figs. 1 and 5 that the corner strips which carry the heaviest flux density are parts of equally spaced laminations at the poles. Likewise, the outer strips at the sides and also those at the top and bottom of the section, Fig. 5 are a part of laminations equally spaced and also evenly interspaced between those connected by the corner strips. Obviously, the centrally located strips will not carry so much flux, but they are similarly parts of laminations which are evenly spaced so that weaker distribution is not localized. The result is that electrically and magnetically, the field frame, subject matter of this case, makes possible a laminated construction as the pole pieces of the frame, each lamination of which is electrically connected through a back strap of the identical material, there being no physical joints or the like which give rise to losses of energy. The distribution of the flux density is such that a relatively perfect distribution over the pole piece areas has been produced, that being something very desirable in the design of compact, light, powerful units which function on a minimum of current. In the prior art devices, distribution at the pole pieces has frequently varied to a great extent, the flux density frequently being only a relatively small fraction at some points of what it has been at others.

While the description relative to the frame of Fig. 1 relates to a structure built up from three sub-assemblies, just as the number of laminations in a sub-assembly may vary, the total number of units going to make up a complete frame may be varied. After the sub-assemblies have been fabricated, they are pushed endwise into the position they occupy in Fig. 1. The size of parts is such that they nest with a minimum of clearance, the parts being clamped by the windings 23 and 24 or in any other satisfactory manner. The more sub-assemblies, the greater the number of nesting parts.

If for some particular reason, it is desired to vary the pattern of the flux density over the pole piece areas, the arrangement of the strips within the sub-assemblies and also the relative arrangement of said strips in the total assembly may be so varied as to give the greatest density at those places desired.

Sometimes it may be practicable to vary the number of laminations in sub-assemblies so that in some there will be more than in others. In other words, each sub-assembly need not, in all cases, be the same as the others. Flux distribution may be thus controlled for special purposes.

The pole pieces and connecting yoke require no additional finishing operations after they are assembled and after winding, except possibly at the inner diameter of the pole pieces which determines the air gap between the field and armature. For that purpose, a grinding or other machining operation may bring the surfaces to the exact dimension required and will also remove any burrs or other projections resulting from the blanking operation.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a motor field frame, the combination of pole pieces and a yoke connecting said pole pieces adapted to carry field windings, said yoke and pole pieces comprising laminations, the number of laminations in the said pole pieces being a multiple of the number of laminations in the yoke, each lamination of said yoke being formed from a plurality of strips connecting opposite pole pieces, strips from adjacent laminations at the pole pieces being arranged in abutting relationship within each said lamination, said connecting strips being so disposed that corner strips at said yoke connect to spaced ones of the laminations at the pole pieces, thereby to equalize flux density over the pole area.

2. In a motor field frame, the combination of pole pieces and a yoke connecting said pole pieces and adapted to carry field windings, said yoke and pole pieces comprising laminations, the number of laminations in the said pole pieces being a multiple of the number of laminations in the yoke, each lamination of said yoke being formed from a plurality of strips connecting opposite pole pieces, strips from adjacent laminations at the pole pieces being arranged in abutting relationship within each said lamination, said connecting strips being so disposed in the complete unit that, considering a cross-section of said yoke, those strips which carry magnetic flux of greatest density connect to spaced ones of said laminations which are so separated and disposed that over the total pole area, the flux density is substantially uniformly distributed.

3. In a motor field frame, the combination of pole pieces and a yoke connecting said pole pieces and adapted to carry field windings, said yoke and pole pieces comprising laminations, there being a greater number of laminations at the pole pieces than in the yoke, each lamination of said yoke being formed from a plurality of strips each of which is an integral part of and connects its respective, opposite pole piece laminations, said strips in a single yoke lamination being disposed in abutting relationship laterally of the lamination.

4. In a motor field frame, the combination of pole pieces and a yoke connecting said pole pieces and adapted to carry field windings, said yoke and pole pieces comprising laminations, there being a greater number of laminations at the pole pieces than in the yoke, each lamination of said yoke being formed from a plurality of strips each of which is an integral part of and connects its respective, opposite pole piece laminations, said strips in a single yoke lamination being disposed in abutting relationship laterally of the lamination, there being a plurality of nesting pole piece and yoke assemblies which combine to form a complete frame.

5. In a motor field frame, the combination of pole pieces and a yoke connecting said pole pieces and adapted to carry field windings, said frame being formed from a plurality of nested assemblies each of which comprises laminations, there being a greater number of laminations at each assembly pole piece than at the yoke thereof, a single lamination of the yoke comprising a plurality of strips each of which is an integral part of and connects its respective, opposite pole piece laminations, said strips in a single yoke lamination being disposed in abutting relationship laterally of the lamination.

6. A method of fabricating a field frame for electrodynamic apparatus which comprises forming a plurality of integral laminations each of which consists of pole piece portions and connecting strips between them forming a yoke, spacing said connecting strips in interleaved relationship, pressing said laminations to form an interlocked sub-assembly structure having a yoke thickness equivalent to a single lamination and combining a plurality of sub-assemblies in nested relationship to form a field frame.

GEORGE G. RAYMOND.

REFERENCES CITED

The following references are of record in the file of this patent:

UNITED STATES PATENTS

| Number | Name | Date |
|---|---|---|
| 485,284 | Lehman | Nov. 1, 1892 |
| 1,255,606 | Hensley | Feb. 5, 1918 |
| 1,654,306 | Paszkowski | Dec. 27, 1927 |
| 2,131,436 | Howell | Sept. 27, 1938 |